United States Patent
Parasnis et al.

(10) Patent No.: US 7,574,383 B1
(45) Date of Patent: Aug. 11, 2009

(54) SYSTEM AND METHOD FOR PROVIDING DISTRIBUTED INVENTORY MANAGEMENT

(75) Inventors: Abhay Vinayak Parasnis, Coppell, TX (US); Ashish Bharara, Dallas, TX (US)

(73) Assignee: i2 Technologies US, Inc., Dallas, TX (US)

( * ) Notice: Subject to any disclaimer, the term of this patent is extended or adjusted under 35 U.S.C. 154(b) by 716 days.

(21) Appl. No.: 10/120,571

(22) Filed: Apr. 10, 2002

Related U.S. Application Data

(60) Provisional application No. 60/283,448, filed on Apr. 11, 2001.

(51) Int. Cl.
*G06Q 30/00* (2006.01)
(52) U.S. Cl. .................. 705/28; 705/8; 705/22
(58) Field of Classification Search ............. 705/22–28, 705/30, 8
See application file for complete search history.

(56) References Cited

U.S. PATENT DOCUMENTS

| | | | | |
|---|---|---|---|---|
| 5,608,621 A | * | 3/1997 | Caveney et al. | 705/10 |
| 5,712,989 A | * | 1/1998 | Johnson et al. | 705/28 |
| 5,765,143 A | * | 6/1998 | Sheldon et al. | 705/28 |
| 6,081,789 A | * | 6/2000 | Purcell | 705/37 |
| 6,341,271 B1 | * | 1/2002 | Salvo et al. | 705/28 |
| 6,374,254 B1 | * | 4/2002 | Cochran et al. | 707/102 |
| 6,421,676 B1 | * | 7/2002 | Krishnamurthy et al. | 707/102 |

OTHER PUBLICATIONS

U.S. Appl. No. 10/119,990, entitled "*Intelligent Fulfillment Agents*,", 46 pages, filed Apr. 10, 2002.

* cited by examiner

*Primary Examiner*—F. Zeender
*Assistant Examiner*—Garcia Ade
(74) *Attorney, Agent, or Firm*—Booth Udall, PLC; Steven J. Laureanti

(57) ABSTRACT

A method for distributed inventory management includes receiving information regarding a number of participants in a value chain and information regarding one or more items relevant in the value chain. The method also includes modeling relationships between two or more of the participants based on the received information and modeling the one or more items based on the received information. Furthermore, the method includes receiving inventory data from the participants relating to the one or more items, processing the inventory data based on the models of the relationships and the items to generate inventory information related to one or more of the participants, and communicating the generated inventory information to one or more of the participants. The inventory information at least partially includes information regarding inventory data of participants other than those participants to which the inventory information is communicated.

30 Claims, 6 Drawing Sheets

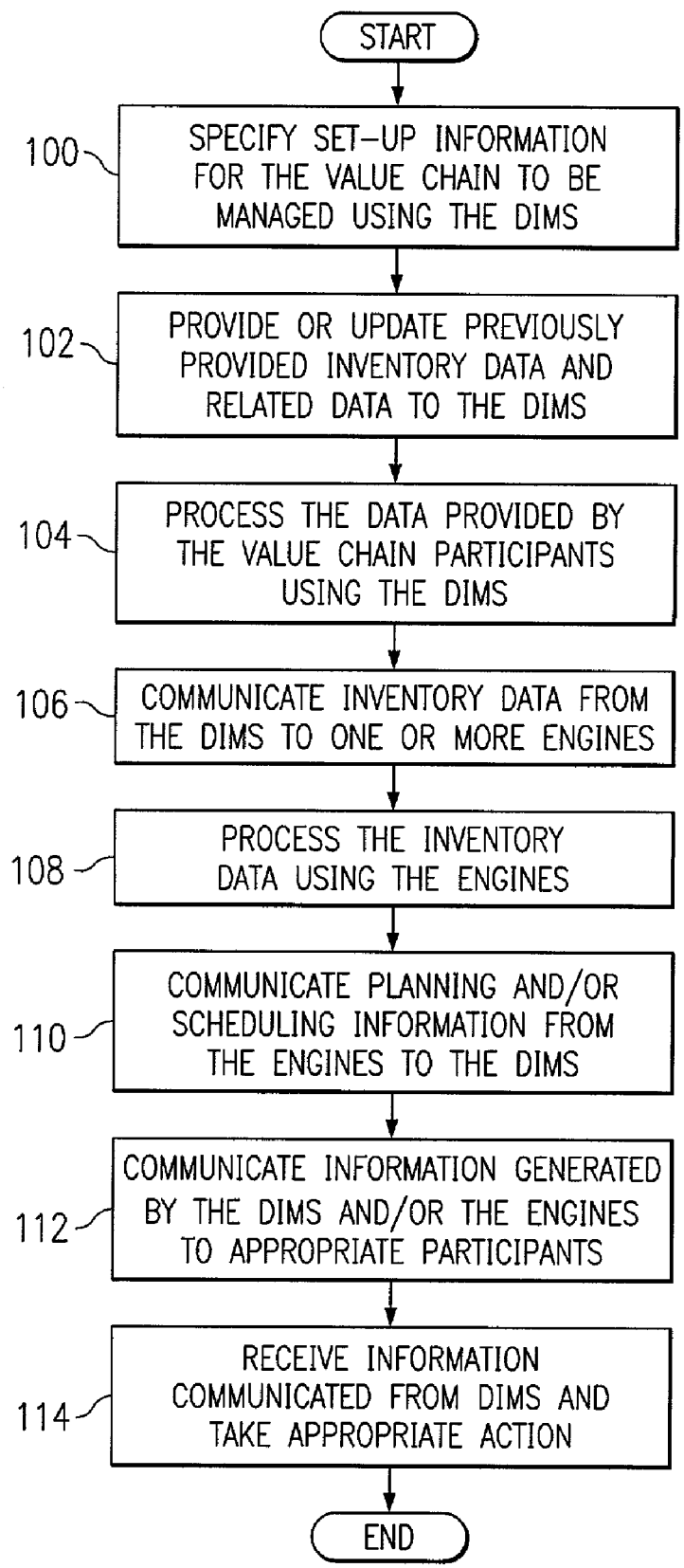

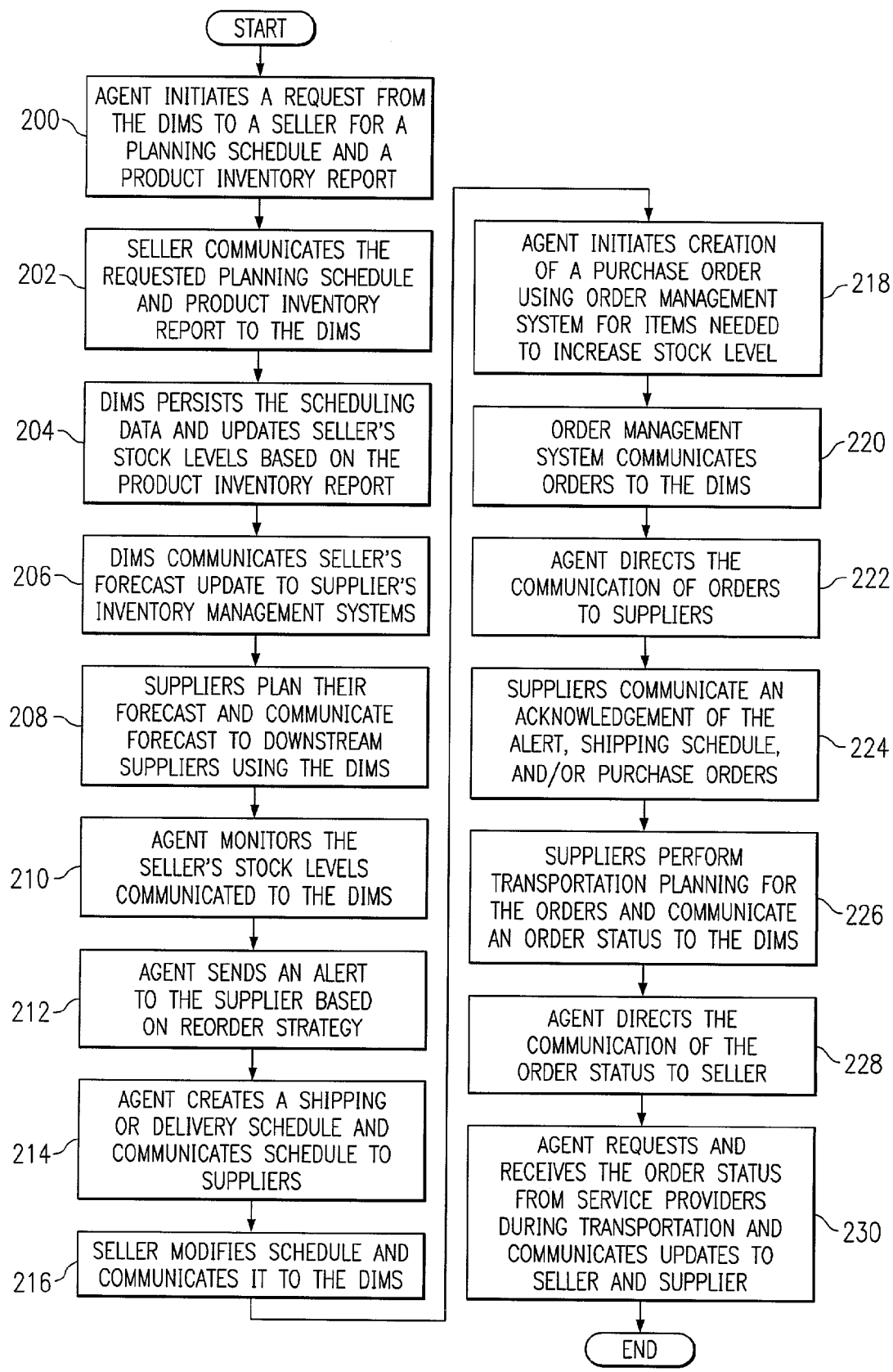

SYSTEM AND METHOD FOR PROVIDING DISTRIBUTED INVENTORY MANAGEMENT

RELATED APPLICATIONS

This application claims the benefit under 35 U.S.C. § 119 (e) of U.S. Provisional Application Ser. No. 60/283,448, filed Apr. 11, 2001 and entitled System Incorporating Distributed Inventory Backplane, Intelligent Collaborative Fulfillment Agents, And Distributed Order Fulfillment Concepts, Singly Or In Any Combination.

TECHNICAL FIELD OF THE INVENTION

This invention relates generally to the field of business management and more particularly to distributed inventory management.

BACKGROUND OF THE INVENTION

Various inventory replenishment processes are employed by businesses to fulfill orders and manage inventory. Although business use various types of replenishment processes (which are often customized for the business), some of the most commonly used processes are Vendor-Managed Inventory (VMI) programs, Supplier-Managed Inventory (SMI) programs and Just in Time (JIT) programs. In a VMI program, a vendor of products takes over the responsibility of managing the inventory of certain products for a given customer. Depending on the situation, the vendor might receive data such as forecasted demand, product consumption rates, inventory positions from the customer, and other inventory-related data. The vendor may also or alternatively be responsible for generating part of the data on the customers behalf. The vendor then uses the received and/or generated data to determine how much of the product to replenish and when such replenishment should occur.

In an SMI program, a seller negotiates with a sub-set of its suppliers to create supplier hubs dedicated to that seller (and which may be managed by a third party). As part of the negotiation, the third party and the suppliers agree to particular service levels at a hub, such as speed of delivery of replenishments of inventory and minimum and maximum stock levels. On a periodic basis throughout a given day, the seller may communicate with the third party provider to move material from the hub to the plant (a JIT arrangement). On a weekly or monthly basis, the seller may send a forecast to the suppliers. The suppliers are then responsible for maintaining inventory within the negotiated levels at the hub using this daily product movement and forecast information.

Although these various replenishment processes provide adequate inventory management, problems arise when multiple entities are involved in a value chain and especially when these multiple entities carry out different types of replenishment programs between one another.

SUMMARY OF THE INVENTION

According to the present invention, disadvantages and problems associated with previous business management systems have been substantially reduced or eliminated.

According to one embodiment of the present invention, a method for distributed inventory management includes receiving information regarding a number of participants in a value chain and information regarding one or more items relevant in the value chain. The method also includes modeling relationships between two or more of the participants based on the received information and modeling the one or more items based on the received information. Furthermore, the method includes receiving inventory data from the participants relating to the one or more items, processing the inventory data based on the models of the relationships and the items to generate inventory information related to one or more of the participants, and communicating the generated inventory information to one or more of the participants. The inventory information at least partially includes information regarding inventory data of participants other than those participants to which the inventory information is communicated.

Particular embodiments of the present invention may provide one or more technical advantages. For example, certain embodiments of the present invention real-time visibility into the inventory information associated with distributed participants in multiple tiers of a value chain. Particular embodiments also integrate these participants and their inventory information with various decision support planning and execution systems and provide business analysis with features such as monitoring of key performance measures (such as order fill rates, shipment variance, and inventory turns), reporting, and exception and alert management. Certain embodiments also provide integration into planning, order management and warehouse management systems of value chain participants.

Embodiments of the present invention may also provide improvements over existing systems, such as reduced capital blocked in inventory (resulting in improved return on assets), reduced warehouse and handling costs, reduced cost of goods sold, increased inventory turns, reduced logistics costs, decreased exposure to price protection liabilities, and increased customer satisfaction.

Other important technical advantages are readily apparent to those skilled in the art from the figures, descriptions and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIG. 3 illustrates an example method for replenishment planning and execution using a distributed inventory management system;

FIG. 4 illustrates an example inventory workflow that may be implemented and automated using agents;

DESCRIPTION OF EXAMPLE EMBODIMENTS

Figure 1:
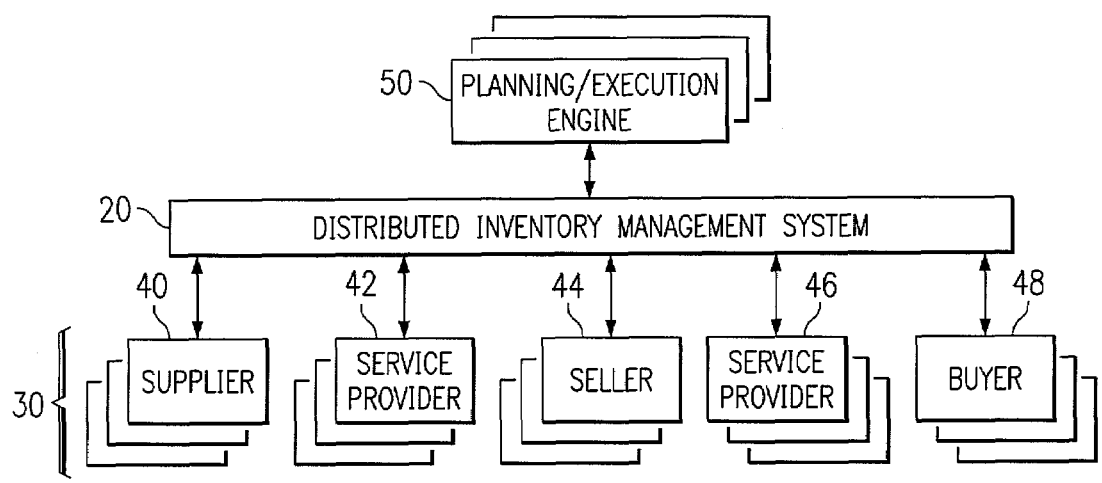
FIG. 1 illustrates an example distributed inventory management system for managing the inventory of one or more participants in a value chain.

FIG. 1 illustrates an example distributed inventory management system (DIMS) 20 for managing the inventory of one or more participants 30 in a value chain. DIMS 20 couples inventory data resources of a number of different participants 30 in a value chain with one or more planning and/or execution engines 50 that use the inventory data to plan and execute inventory-related business decisions. Participants 30 may include one or more suppliers 40 of components used to manufacture or otherwise create products, one or more sellers 44 that manufacture or otherwise create the products (for example, a seller 44 may be an original equipment manufacturer), and one or more buyers 48 that purchase the products from sellers 44. Participants 30 may also include one or more service providers 42 and 46 that serve as intermediaries between suppliers 40 or buyers 48 and sellers 44. As examples only, service providers 42 may include third party logistics (3PL) providers, contract sellers, or distributors, and service providers 46 may include 3PL providers, value-added resellers (VARs), or distributors.

It should be noted that each participant 30 may act as a "buyer" or a "seller" with respect to another entity in the value chain and the terms used above to name each participant 30 should not be construed as limiting the roles of participants 30. Furthermore, participants may include one or more sub-organizations that carry out the various roles. As an example only, a seller 44 may be a manufacturer that includes a buying sub-organization that interacts with suppliers 40 (either directly or through a service provider 42) to obtain components, a manufacturing sub-organization that manufactures one or more products using the components, and a selling sub-organization that interacts with buyers 48 (either directly or through a service provider 46) to sell the manufactured products. Participants 30 may alternatively or additionally include any other entities participating in a value chain. The present invention also contemplates that some or all of participants 30 may be associated with the same entity (for example, multiple participants 30 may be different divisions of a company).

In general, DIMS 20 brokers pertinent data between participants 30 and engines 50 to propagate inventory planning and execution information between participants. For example, participants 30 may communicate inventory data to DIMS 20 and DIMS 20 may process this data and communicate inventory information from the processed data back to one or more participants 30. DIMS 20 may also or alternatively communicate this data from participants 30 to one or more engines 50. Engines 50 may then communicate inventory planning and execution information back to DIMS 20, which may then make this information available to some or all of participants 30. Although DIMS 20 and engines 50 are illustrated in FIG. 1 as being separate from participants 30, it should be understood that some or all of DIMS 20 may be associated with one or more of participants 30. For example, some or all modules of DIMS 20, as will be described below, may be associated with a seller 44 and the suppliers 40, service providers 42 and 46, and/or the buyers 48 who wish to share inventory planning and execution information amongst one another may communicate inventory data to and receive inventory information from the components of DIMS 20 associated with the seller 44. As an alternative, DIMS 20 may be implemented independently from participants 30 (for example, in an e-commerce marketplace or other node of a trading network). In a similar manner, each engine 50 may be associated with a particular participant 30 or may be implemented independently from participants 30. As another alternative, a DIMS 20 may exist at each of a number of locations (either associated with a participant 30 or a third party) and/or the components of an individual DIMS 20 may be distributed amongst multiple locations.

Participants 30 may each operate one or more computer systems at one or more locations. These systems of participants 30 may interact with DIMS 20 autonomously or according to input from one or more users associated with a participant 30. DIMS 20, the systems of participants 30, and engines 50 may be coupled to one another using one or more local area networks (LANs), metropolitan area networks (MANs), wide area networks (WANs), a portion of the global computer network known as the Internet, or any other appropriate wireline, wireless, or other links. Participants 30 and DIMS 20 may be arranged and communicate with one another according to a hub-and-spoke, peer-to-peer, or any other suitable architecture.

The use of DIMS 20 for inventory management provides numerous advantages over previous techniques, which have inherent inefficiencies that are caused by a lack of connectivity, timely communication, and visibility between the various participants 30. Although current techniques for implementing replenishment processes (such as VMI, SMI, and JIT) are suitable for the needs of some businesses, these techniques include several disadvantages. In many value chains, different replenishment programs and policies are used in different tiers of the value chain. For example, a JIT program may be used between a seller 44 and a service provider 42 and a separate SMI policy may be used between the service provider 42 and a supplier 40. Because of the disconnect between the JIT policy used between the seller 44 and the service provider 42 and the SMI policy used between the service provider 42 and the supplier 40, inefficiencies are created in the value chain. Furthermore, it is also common in value chains for a participant 30, such as an seller 44, to use different policies with different trading partners. For example, an seller 44 may use a VMI policy with one buyer 48 (for example, a retailer) and may use a non-VMI policy with another buyer 48. As with the use of different policies in different tiers of the value chain, this disconnect in the policies in use between the seller 44 and the two buyers 48 also introduces inefficiencies.

In addition to problems associated with the use of different replenishment policies, problems also arise when attempting to obtain data from the various participants 30 as input to one or more planning or execution engines 50, such as a replenishment planning engine. Such engines 50 can add significant value in the planning of activities and flows within the value chain; however, it has been problematic to gather all the data from the various participants 30 in a consistent fashion and to integrate the engines 50 with each participant 30. Furthermore, in situations where planning or execution engines are run in a batch mode (often due to the lack of real-time data from participants 30), participants 30 have not able to leverage the real-time feed-back of inventory changes occurring in the value chain. In short, most inventory management systems lack connectivity between participants 30 and do not provide adequate visibility into inventory information of the participants 30 in the value chain. This leads to increased production costs and reduced profits through the value chain due to problems such as unanticipated stock-outs, decreased production efficiency, higher investment in safety stock, increased obsolete and excess inventory, and inventory being in the wrong locations in the value chain.

The use of DIMS 20 reduces or eliminates these inefficiencies and allows each participant 30 in a value chain to simultaneously lower inventory, improve responsiveness, and lower costs. Additionally, participants 30 can collectively understand how relationships and interactions need to be modified in order to achieve or improve on desired objectives. DIMS 20 provides participants 30 with one logical distributed inventory "backplane" which has the capability to model engagement rules to enable interoperability of fulfillment/replenishment policies in different tiers of a value chain or co-existence of multiple fulfillment/replenishment policies for a given participant 30 in a value chain. This is accomplished by providing a framework to construct and maintain a virtual unification of the different systems against which business intelligence can be written.

Each participant 30 in a value chain typically generates exposed or exposable information relating to that participant's 30 physical elements within the value chain (such as warehouses, manufacturing facilities, stores, and delivery trucks). For example, this information may include information regarding which products are in which warehouse of a participant 30 or which orders map to which lots on a particular truck of a participant 30. Each participant 30 also may create exposed or exposable business logic and operations at the element level of the supply chain (for example, purchase order acceptance and generation functions and order processing functions). However, this information is often not available throughout the value chain. DIMS 20 collects this information and business logic to provide a unified and normalized data model of the inventory information available at all participants 30 in the value chain that are coupled to and communicate with DIMS 20. For example, the data model may identify which products are in which warehouses across the entire value chain or identify which orders map to which lots on which truck at any point in the entire value chain. Therefore, DIMS 20 may provide any participant 30 visibility, typically on a permissions basis, into inventory information of any other participant 30. In addition, this unified and normalized information may be communicated to one or more engines 50, and the output from the one or more engines 50 may be provided to any relevant participants 30 for planning and execution purposes.

Figure 2:
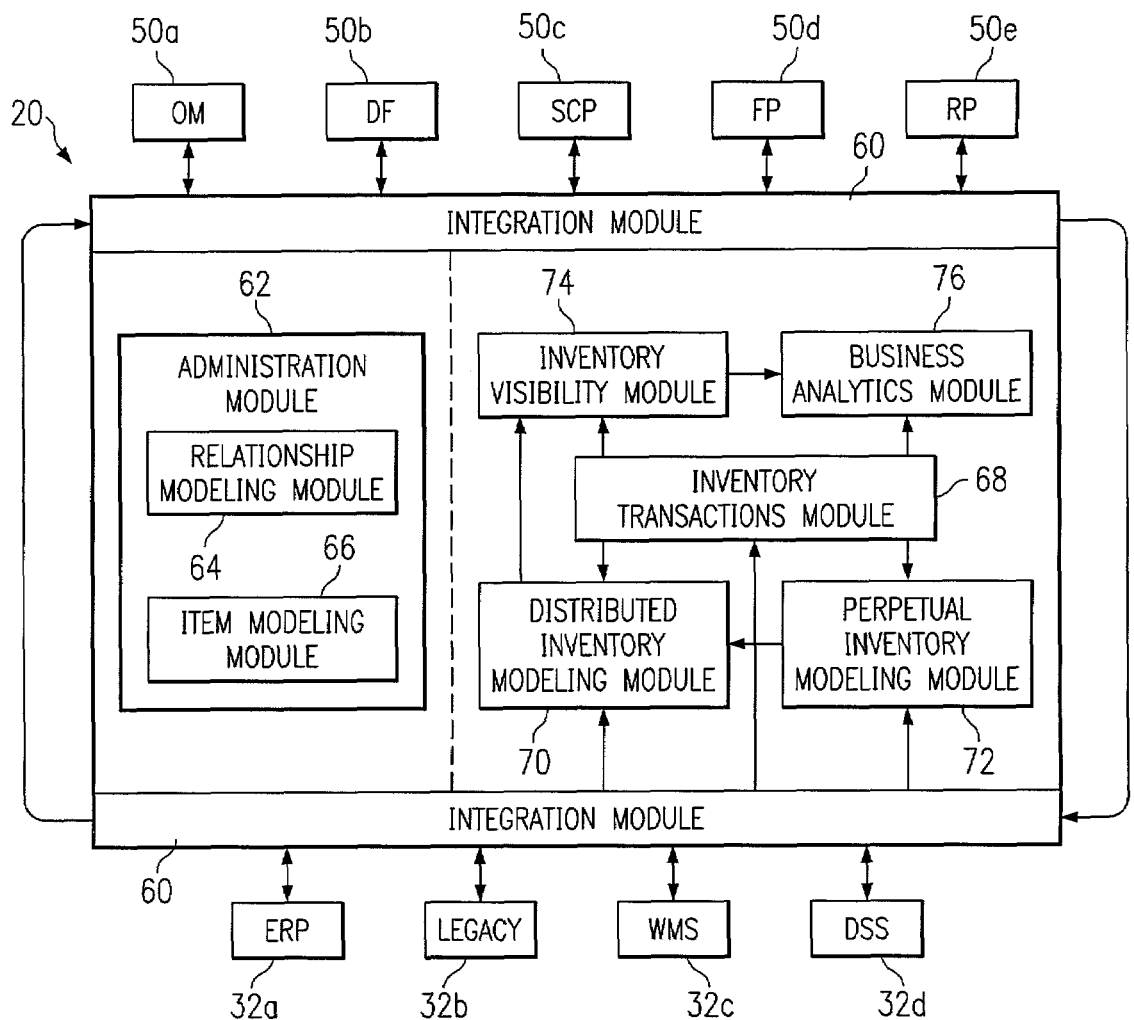
FIG. 2 illustrates an example distributed inventory management system in further detail.

FIG. 2 illustrates an example DIMS 20 in further detail. DIMS 20 includes several components or modules that perform various inventory management or related functions. DIMS 20 may be implemented as any appropriate combination of software and/or hardware operating in one or more locations. In one example embodiment, all of the modules associated with DIMS 20 are executed on one or more computers associated with a particular participant 30. In another example embodiment, certain modules may be executed on one or more computers associated with a first participant 30, other modules may be executed on one or more computers associated with a second participant 30, and yet other modules may be executed on one or more computers associated with a third party (such as in an e-commerce marketplace). Furthermore, all of the modules may be executed on one or more computers associated with a third party. Any other appropriate location and distribution of the modules may also be used.

One module that the example DIMS 20 includes is an integration module 60. Integration module 60 serves to integrate DIMS 20 with various information systems 32 of participants 30 and with one or more planning and execution engines 50. This integration allows inventory data and other related information to be received and processed by DIMS 20 and, where appropriate, engines 50. Integration module 60 allows information to be communicated between DIMS 20 and/or engines 50 to information system 32 or other systems associated with participants. Integration module 60 may handle connectivity to upload and download data in the context of the role-based or system-based workflows. The integration may be at a custom API level, as well as conforming to industry standards like EDI, RosettaNet™, and the like. Based on the characteristics of the various participants 30 that need to interact, integration module 60 may be configurable to interact on a transaction-by-transaction basis, a net change basis, using a complete batch refresh of data at specified time intervals, and/or on any other basis.

Integration module 60 may include appropriate components for communicating with and accessing data stored at or communicated from participant systems 32. Systems 32 may include resource planning (ERP) systems 32a, legacy systems 32b, warehouse management systems (WMS) 32c, decision support systems (DSS) 32d, and/or any other appropriate type of systems operated by one or more participants 30 that are associated with the management of inventory and related information. Appropriate components of integration module 60 may receive or request inventory data from one or more systems 32 associated with one or more participants 30 and may then communicate this information to other modules of DIMS 20 and/or to engines 50 for processing. Therefore, integration module 60 may also include one or more components for communicating with and accessing data stored at or communicated from engines 50. Engines 50 may include order management engines 50a, demand fulfillment engines 50b, supply chain planning engines 50c, factory planning engines 50d, replenishment planning engines 50e, and/or any other appropriate type of planning and/or execution engines that may be useful for the management of inventory and related information. As described above, these engines 50 may be associated with one or more participants 30 or with a third party (such as with an e-commerce marketplace).

Integration module 60 may also perform translation of data received from a system 32 and/or an engine 50 as appropriate for the destination to which the data is to be sent. For example, integration module 60 may translate the data format of inventory data received from an ERP system 32a so that it may be used by other modules of DIMS 20 and/or a replenishment planning system 50e. Planning data received from the replenishment planning system 50e may then be translated back to a format appropriate for the ERP system 32a and/or any other systems 32. Integration module 60 may also or alternatively perform any other appropriate types of translation. Furthermore, integration module 60 may manage requests for data from systems 32 and/or engines 50 and responses to these requests. For example, integration module 60 may provide authentication and authorization of such requests. Integration module 60 may also serve to queue requests and responses, if appropriate, for communication to a suitable destination.

The example DIMS 20 also includes an administration module 62 that is used to configure and set-up the users of DIMS 20 which includes configuring the identity of the users of the system (participants 30 in a value chain) and their role-based permissibility as well as the frequency and types of messages that DIMS 20 is going to receive from participants 30 and other external sources. Two primary aspects of administration module 62 are a relationship modeling module 64 and an item modeling module 66.

Relationship modeling module 64 is used to specify parameters associated with the inter- and intra-enterprise participants 30 in the value chain. The transactions and the data permissibility are governed by the rules configured using module 66. Participants 30 that may be modeled include the various divisions of an enterprise and their locations (including location hierarchies) within the enterprise, as well as the customers and the suppliers that the enterprise interacts with. In essence this is the physical map that lays out the various participants 30 with which DIMS 20 is to interact, as well as their locations, roles, business rules, and/or any other appropriate parameters. Module 66 may also be used to implement agents, as described below.

Item modeling module 66 is used to specify the items relevant in the value chain, their descriptions, the locations at which the items are active, the item hierarchy, the unit of measure (UOM) of each item (and any hierarchies for the UOMs), and/or any other suitable parameters relating to the items. Module 66 also plays a role in the aggregation of data, described below, in the sense that cross-referencing rules for the items may be specified using this module 66. The ownership aspect of inventory is also specified using module 66.

The example DIMS 20 also includes an inventory transactions module 68 that provides industry specific-configurable transaction mappings. The transactions may also have the capability of being solution-specific within an industry. All relevant transactions may be defined using module 68. These transactions may then facilitate interaction with systems 32 and engines 50. Module 68 also provides views of transactions as well as techniques for manually creating and editing transactions. A transaction history may also be maintained for audit trail purposes.

Furthermore, the example DIMS 20 includes an distributed inventory modeling module 70 and perpetual inventory modeling module 72. Distributed inventory modeling module 70 provides a unified view of inventory information across the distributed systems 32 of participants 30 (which, as described above, may be intra-enterprise situation and/or inter-enterprise entities). Distributed inventory modeling module 70 provides a configurable and expandable inventory state map definition framework. This is useful since modeling a distributed environment typically requires interfaces with disparate types of systems 32. Also, module 70 provides the ability to model computed and instance-specific states of inventory to support various industry solution workflows. Perpetual inventory modeling module 72 functions to act as a complete system supporting all the functions of a enterprise inventory management system. Perpetual inventory modeling module 72 functions to act as a complete system supporting all the functions of a enterprise inventory management system, such as transaction reconciliation, attribute level lot tracking, and tracing functions.

The example DIMS 20 also includes an inventory visibility module 74 that is integrated with inventory modeling modules 70 and 72 and inventory transaction module 68 to provide users with views into the distributed inventory environment. Module 74 also provides user-configurable reports that allow users with different roles to quickly access relevant data and make informed decisions. Based on information from modeling module 70, a users can select a relevant portion of the inventory data regarding to view. Furthermore, the views may also provide information regarding the underlying transactions affecting the inventory in the value chain. Based on the permissibility framework established using relationship modeling module 64, participants 30 may able to only view inventory which they have permission to view. Module 74 also provides the ability to define user-defined event triggers based on the distributed inventory information, thus enabling proactive management of inventory.

In addition, the example DIMS 20 includes a business analytics module 76 that provides the analytics services for both inventory transactions and for past, current and future inventory positions. For example, transaction audit trails may be used to view lot track and trace information. Furthermore, trending and profiling information may be provided using module 76. For example, module 76 may be used to track the performance of new products as well as products that are being phased out, may be used to analyze liability and exposure in cases of consigned inventory, may be use to keep and track participant performance metrics, and/or may be used to perform any number of other suitable business analyses.

Although particular example modules have been described, it should be understood that DIMS 20 may include additional module, may not include some of the example modules, and may implement particular functions in a different manner than described above. The various modules of DIMS 20 collectively provide a common, distributed backplane between multiple participants 30 in different tiers of a value chain. This common backplane enables each participant 30 to acquire relevant information from other participants 30 related to inventory management and enables multiple participants 30 to provide data to a planning or execution engine 50 and receive the output of that engine 50 that is generated using the input of the multiple participants 30. For example, an seller 44 is able to obtain information on planned shipments of components from suppliers 42 and information on planned purchases by buyers 48, and thus is able to manage its inventory accordingly.

By enabling the common distributed backplane between the various participants 30, a seller 44 (or any other participant 30) is able to manage products being fulfilled and replenished using different policies through a single gateway. This provides the seller 44, for example, with a consolidated and accurate status on the state of affairs of a particular product with respect to multiple buyers 48 even though different inventory management policies may be used with each buyer 48. Service providers 42, 46 can also be updated with respect to the planned movement of goods in the value chain. Therefore, all participants 30 potentially can have visibility into any appropriate information needed and can get this information from a single source, regardless of the inventory management program(s) in which the participant 30 is involved. This process creates efficiencies in the value chain by reducing or eliminating the need to plan against uncertainties created due to the lack of information related to inventory.

DIMS 20 also provides for different user roles (such as brand manager, fulfillment manager, and replenishment planner) that provide users with a customized view of inventory across various geographical and product hierarchies. For example, a brand manager might be only interested in getting visibility into safety stock levels across all locations and to be alerted to the possibility of a channel being starved or carrying excess. A replenishment planner, in addition to the information required by a brand manager, might also need visibility into in-transit inventory and an average weekly forecast. The use of DIMS 20 to model the value chain enables this custom visibility to different users. For example, geographic hierarchies can be modeled and thus a user of DIMS 20 can log on and request inventory information on a given product family for a given geographic region. In this case, inventory positions for that product family can be aggregated across all the warehouses in that region (and also from the stored connected to the warehouses, if this information is provided). The user would then be able to drill down to specific locations, and even get details by buyer and buyer location. DIMS 20 may also enable modeling of product hierarchies. In this case, for example, a brand manager can acquire visibility to inventory at a brand level and a replenishment planner can get visibility at a product stock keeping unit (SKU) level.

DIMS 20 also allows for easy definition of business rules throughout the value chain. Different users can easily monitor the value chain by receiving notifications of violations of the business rules. These rules can be based on minimum or maximum quantity inventory positions, computed minimum or maximum days of inventory based on projected sales-out and ending inventory, or based on numerous other criteria. Upon violation of a rule, DIMS may communicate a notification to a designated list of users. Furthermore, a violation of a rule may trigger a business process. As an example only, in scenarios like VMI, a violation of a minimum quantity rule may result in an alert being communicated to relevant participants 30 and/or a replenishment order being generated using an order management system. The generation of such a notification and the initiation of business processes may be performed using agents, as described in further detail below.

Furthermore, business logic may exist in DIMS 20 that serves as an intelligent mediator between systems 32 and engines 50. For example, the intervening business logic may: evaluate incoming changes to determine if re-planning or aborting of an ongoing planning cycle is warranted, reconcile plan results with changes made in the model after a planning snapshot is taken, compare plan results with the current model state to compute net changes for communication to the chain elements, and/or direct messaging or model modifications to apply the model in accordance with the computed plans. The resulting combination of DIMS 20, batch mode replenishment planning engine(s) 50e, and the logic described above provides a quasi-adaptive replenishment planning solution. Such a solution provides benefits such as flagging of exceptions in mismatches when different policies are used in different tiers in the value chain, use of a common inventory backplane to manage products under different policies with different participants 30, an efficient way to evolve or change from one policy to another, and an efficient way to evolve from a batch-based fulfillment/replenishment planning paradigm to an adaptive fulfillment/replenishment planning paradigm.

FIG. 3 illustrates an example method for replenishment planning and execution using DIMS 20. Using DIMS 20, automated replenishment planning and execution in the multi-party inventory chain (including some or all participants 30 of a value chain) can be addressed by using data collected from the multiple participants 30 in a replenishment planning engine 50e and/or by using business logic associated with DIMS 20 to communicate the resulting inventory plans to the relevant participants 30 in the inventory chain.

The example method begins at step 100 where one or more participants in the value chain communicate with administration module 62 to specify set-up information for the value chain to be managed. The set-up information provides DIMS 20 with information regarding the make-up and characteristics of the value chain so that DIMS 20 may be used to manage the value chain. As an example, set-up information provided by a supplier 40 may include, but is not limited to: information regarding products, product components, or other items included in the value chain to be managed and information regarding the participants 30 in the value chain (such as the identity and location of the various participants 30, the role of participants 30, the manner in which particular participants 30 interact, and business rules associated with participants 30). Participants 30 may communicate with administration module 62 using any appropriate communication techniques.

At step 102, participants 30 provide or update previously provided inventory data and related data (such as demand, supply, and capacity data) using systems 32 and/or other appropriate data sources. As an example, a seller 44 may update inventory planning data to reflect an excess or shortage at supplier 40. Data is provided to DIMS 20 through integration module 60 which is operable to communicate with systems 32 and perform any necessary data translation for use by DIMS 20. Data may be communicated to DIMS 20 on a as generated, as requested, on scheduled basis, or in any other appropriate manner. Furthermore, this communication of data may be based on a "push" or "pull" method. For example, systems 32 may communicate or "push" data to DIMS 20 when relevant data is available or on a scheduled basis. Alternatively or in addition, DIMS 20 may request or "pull" relevant data from systems 32 as needed or on a scheduled basis. DIMS 20 may store the data in any appropriate data storage location associated with or independent of one or more of the modules of DIMS 20.

At step 104, one or more modules of DIMS 20 perform internal processing of the data provided by participants 30. For example, the inventory data may be communicated to inventory visibility module 74 so that it may be organized and integrated into views that may be communicated to users associated with participants 30. As described above, the data may be organized so that it may be presented to a user having a particular role and having permission to view particular data. Furthermore, inventory visibility module 74 may monitor the data or information generated from the data and determine when an exception has occurred and/or when an alert should be communicated to particular participants 30. Business analytics module 76 may also be used to analyze the inventory data for auditing, tracking, trend analysis, or for other types of data analysis. Processing may also occur in association with one or more agents associated with DIMS 20 that are responsible for performing particular business functions with respect to the inventory data.

Alternatively or in addition to performing step 104, DIMS 20 may communicate inventory data to one or more engines 50 at step 106. Engines 50 process this inventory data at step 108 using suitable techniques for the particular engine 50 and type of data. For example, inventory data from multiple participants 30 may be communicated to replenishment planning engine 50e for generation of a replenishment plan and/or schedule, inventory data may be communicated to an order management system 50a for generation of appropriate orders to replenish depleted inventory indicated by the inventory data, and/or any other suitable processing may be performed on the received inventory data by these or any other suitable engines 50. Engines 50 may update an associated plan or schedule whenever inventory data or set-up information is changed by a participant 30 or on a periodic basis (for example, by requesting particular inventory data stored by DIMS 20). A generated plan may also identify exceptions that have occurred due to a change in inventory data. One or more modules of DIMS 20 may also or alternatively analyze a plan or schedule and identify any exceptions (and generate alerts for particular participants 30, if appropriate). At step 110, engines 50 communicate the planning and/or scheduling information to DIMS 20.

At step 112, DIMS 20 communicates inventory information generated by DIMS 20 and/or engines 50 to appropriate participants 30 (such as to systems 32 of particular participants 30) using integration module 60. The inventory information may be communicated based on a request by a participant 30 (such as by a system 32 of a participant 30), based on the generation of data by an engine 50 and/or a module of DIMS 20 that is relevant to a participant 30, based on an alert generated for a particular participants, based on a pre-planned schedule, and/or for any other appropriate reasons. Therefore, this communication of information may be on a "push" or a "pull" basis. For example, a seller 44 may request a view of inventory of a particular item at one or more locations and such a view may be communicated to the user. As another example, a module of DIMS 20, such as inventory visibility module 74, may evaluate incoming inventory data from a supplier 40, recognize that the inventory level of a particular item has dropped below a pre-defined level, and communicate an alert to the supplier 40 and an associated seller 44. As yet another example, an engine 50 may identify an exception in a plan or schedule generated from inventory data received from DIMS 20 and DIMS 20 may communicate the existence of such an exception to appropriate participants 30. In general, DIMS 20 serves as a collection point for inventory information for multiple participants 30 in a value chain and DIMS 20 may serve to communicate the "raw" inventory data of one participant 30 directly to other participants 30, process the data internally and communicate the results of this processing to one or more participants 30, and/or communicate inventory data to appropriate engines 50 for processing and communicate the results of this processing to appropriate participants 30. At step 114, participants 30 receive information communicated from DIMS 20 and take appropriate action.

Although the steps of the example method described above, as well as those described below, are illustrated as occurring in a particular order, it should be understood that the steps may occur in any appropriate order and different steps may occur simultaneously for different instances of inventory data or for other suitable reasons. Furthermore, one or more of the steps may not be performed and/or additional steps may be include as appropriate for the operation of DIMS 20.

As mentioned above, intelligent fulfillment agents may be used by DIMS 20 to conduct various tasks. These fulfillment agents facilitate the triangulation of relevant participants 30 in the context of the various fulfillment and replenishment workflows that occur between the participants 30. Unique business relationships and rules are captured in configurable fulfillment engagement rules that leverage the inventory visibility provided by DIMS 20. The triangulation takes place at two levels: the participant relationship level and the data/information level. In the former, the participants 30 involved are modeled (for example, a buyer 48, a seller 44, and fulfillment/execution service provider 46). The data/information level contains the data and information includes the inventory and other related information provided by DIMS 20. The fulfillment agents enable a seamless flow of information between these two levels thus provide an event-based replenishment transaction management with rich decision support. The agents are also intelligent in that they can adapt to execution level exceptions changes that occur, such as at a planning or strategic level in the value chain. For example, if changes to the network set-up occur or customer demand increases occur, these agents can recognize such changes and use the information about the inventory positions in the value chain to react as necessary with appropriate workflows.

The flexible framework will allow participants 30 to adapt to changing market needs and business rules. Two fundamental enablers of this framework are visibility and connectivity. The visibility provides a view of the inventory both at a discrete level (for example, by SKU, location, or owner) as well as an aggregated view across a distributed environment (for example, a single seller 44 with multiple sites or multiple sellers 44). The transaction management capability of DIMS 20 will let the users track inventory as it changes ownership or is being co-managed by the various entities involved in the fulfillment and replenishment workflows.

Different fulfillment agents may be used for different types of fulfillment and replenishment workflows. For example, one agent may be used for a JIT workflow and another may used for a VMI workflow. Although many other types of agents may be implemented through DIMS 20 to enable any suitable fulfillment and replenishment workflows, for purposes of example a JIT fulfillment agent will be described below in further detail.

There are four main aspects of a typical JIT implementation. The first such aspect is a contract(s) between the relevant participants 30. For example, in a JIT environment, a supplier 40 delivers raw materials and other purchased items as they are needed. A blanket purchase order or other suitable form of basic agreement typically covers the terms and conditions for this procurement. Generally, the relevant participants agree on acceptance criteria before they embark on the JIT program. A set of key performance indicators (KPIs) are often selected to measure the effectiveness of the program and to set criteria for the participants 30 to follow. For example, KPIs may address the service level of the suppliers 40, the inventory turnover, the fill rate, and/or any other suitable measures.

The next aspect of JIT is planning. JIT typically requires a flow of material in the exact quantity required at an exact time. Regardless of the specific method used to achieve this exact material flow, there must be advance planning to ensure that material is available when needed. A technique such as material requirement planning (MRP) is generally used to accomplish this task. In addition to predicting the future material requirements, just-in-time replenishment quantities and minimum/maximum levels need to be determined. Furthermore, early warning visibility and assistance in decision-making related to unexpected events is also needed.

A JIT implementation also involves electronic data interchange (EDI) message transmission and translation. In many value chains, value chain management extends to the sharing of planning, operational, tactical, and strategic data. This includes sharing short-term scheduling data, medium-term materials requirements planning and scheduling, and longer-term forecasts. The traditional technique for performing JIT communications has been the use of EDI over value added networks (VANs). The disadvantages of EDI-VAN are that the use of VANs is expensive, there are many trading partner-specific variations on EDI standards (and thus communication problems are created), and implementing EDI is a costly and technologically challenging process.

Configuration is also an aspect of JIT. Depending on the industry, there are many configurations possible. Some sellers 44 may want to own inventory and typically the suppliers 40 will deliver the material directly to a seller's location when needed. Another alternative may be that sellers 44 establish their own warehouses near a seller's facility and material is delivered in a just-in-time manner when required by a seller 44. Some sellers 44 may opt to have a hub (typically a warehouse managed by third party service provider 42) and suppliers 40 deliver the products directly to hub so that material can pulled on a just-in-time basis from the hub. In this case, either the supplier 40 or the third party service provider 42 owns the inventory depending on the business scenario.

JIT replenishments are normally focused on short-term order fulfillment. The following are example steps of a typical JIT fulfillment process. The seller 44 (such as a manufacturer) sends forecast information and a planning schedule to its suppliers 40 on a periodic basis (for example, weekly). Suppliers 40 use this information for their internal planning. These forecasts typically span a forward horizon of eight to twelve weeks. Seller 44 also sends a shipping schedule to suppliers 40 on a daily or weekly basis. Depending on the business practice, suppliers may or may not be required to provide commits against the shipping schedule. The shipping schedule in a traditional MRP is a push communication. It basically tells the supplier 40 what items the seller 44 wants the supplier 40 to ship. The seller 44 expects to use these items and it wants the supplier 40 to deliver the items whether they end up using the items or not.

On a daily basis, seller 44 monitors the inventory levels and demand signals and sends EDI change notifications to first tier suppliers 40 to adjust the shipping schedules. First tier suppliers 40 examine the contents of the schedules and determine whether or not they can meet the requested quantity. Each first tier supplier 40 then sends an acknowledgment to seller 44. First tier suppliers 40 also input the shipping schedule information into their planning systems to use the information as the basis for their forecast demand. However, daily shipping schedules constantly vary from forecast requirements, so safety stocks (inventory buffers) are added into the calculations and net requirements for raw materials and sub-assemblies or components are calculated. These planned net requirements for procured inventory are then communicated weekly to second tier suppliers 40 (suppliers to the first tier suppliers), sometimes via EDI or more commonly via fax. However, as a result of daily changes in OEM actual demand, first tier suppliers 40 frequently issue daily changes to their planned requirements from their suppliers 40 (the second tier suppliers 40). This same process is repeated between second tier suppliers 40 and third tier suppliers 40, and so on. However, EDI is rarely the communication medium between these lower tier suppliers. More typically, the communication medium is fax, phone, or mail. The net result is considerable delay in communicating requirements to lower levels in the supply chain. As a result, suppliers 40 to the first tier suppliers 40 try to respond to planned requirements several weeks in advance and compensate by building up safety stock levels to accommodate the eventual wide variability in demand.

The first tier suppliers 40 each generate an advanced ship notice once a truck going to the seller 44 is loaded. This transaction notifies the seller of the actual contents of the truck and can be helpful for scheduling the receiving dock and identifying cross-docking opportunities. Similarly, shipping notices also are sent between suppliers 40 at the different tiers. Again, the communication mode may be EDI, but is more commonly fax, phone or email in these cases. The truck carrying the product typically arrives at the seller's 44 dock at its fixed appointment time and is promptly unloaded so that the product can be available to the line. The replenishment lead-time usually is quite short and consists of mainly the in-transit time, which can range from a few hours to few days.

Although the JIT process described above may have advantages over other types of processes, there are also many challenges associated with this traditional JIT fulfillment process. Such challenges include demand variation challenges. Customers (which may include sellers 44 and suppliers 40) generally push variation in demand down to their suppliers 40. This is slow, cumbersome, and overly expensive because forecast data is batched and depends on heavy administrative intervention even where EDI systems are in use. This process inherently builds excess inventory to accommodate wide variations in daily demand. An insidious side effect to the volatility in daily demand is that production schedules are difficult to plan and maintain. This creates inefficiency and causes excessive overtime to be worked. Although a seller 44 provides the forecast data to its suppliers 40, the shipping schedule (JIT material requirements) almost always differs from the forecast because of the demand variation.

There are also communication challenges associated with the traditional JIT process. Although a seller 44 and a first tier supplier 40 may have good relationships and may be communicating through well-established EDI communication programs, this EDI communication gets expensive as more and more participants 30 join the JIT program. In many instances this leads to custom data mapping and maintaining these mappings can get very expensive. On the other hand, the level of sophistication decreases as you move down the supply chain and the downstream suppliers 40 rely mostly on fax, phone and e-mail messages for communication with upstream suppliers 40. In order to compensate for the inefficiencies with such communication techniques, more and more inventory is added to support upstream demand. Furthermore, due to improper communication set-up, delivery problems from lower tier suppliers 40 are often not communicated to upper tier suppliers 40, or such problems result in fragmented, duplicated, or delayed communications. This affects the supplier reliability and creates a lack of trust throughout the value chain.

The traditional JIT process also has visibility challenges. Since traditional JIT fulfillment is an independent process, there is not visibility into any of a seller's planning or transactional data. It also does not contribute to increasing the visibility of the seller's planning processes. Lack of visibility into multi-tier participant inventory (for example, a fourth tier supplier's lack of visibility into the inventory of a first tier supplier 40 or a seller 44) poses a challenge to suppliers 40 since they have to deal with their customer's near term demand changes and end up building more "just-in-case" inventory to satisfy changing demand needs. Changes in order sequence, inventory buildups, delayed response from lower tier suppliers as well as transport delays could be avoided by providing global visibility to all appropriate participants 30.

Because of the above challenges, first tier suppliers 40 spend too much time and money managing and directing their suppliers 40. This approach is labor intensive, results in unreliable part deliveries, and generates high inventory levels in the supply chain. It also results in excessive expediting and high administrative costs. Furthermore, last minute demand and schedule changes result in high premium freights for the suppliers 40. Suppliers 40 also have to consume the high inventory carrying costs that result from inventory they build to safeguard themselves from unpredictable variation in daily demand changes. All of this adds significant cost to the value chain.

The use of a DIMS fulfillment agent for JIT fulfillment can reduce or eliminate the above problems with the traditional JIT fulfillment process. JIT fulfillment agents and other fulfillment agents associated with DIMS 20 may be implemented as software associated with DIMS 20 or may be associated with a participant 30 an be programmed to use information provided through DIMS 20 to accomplish one or more specific business functions that are the responsibility of each agent. As described above, DIMS 20 provides visibility into a buyer's demand signals and planning forecasts for all relevant participants 30 in the value chain. JIT fulfillment agents associated with DIMS 20, as well as the use of other types of agents provided through DIMS 20, may serve to automate the process of monitoring relevant information from participants 30, provide exception monitoring and generation of automatic alerts for participants 30 as and when particular events occur (such as alerts generated when inventory levels are violated), and initiate appropriate business processes in response to this information and events.

Specifically, JIT Fulfillment agents can be used to employ different business models ranging from single-tier model to multi-tier models. In both cases, participants 30 may have one-to-one (a single seller 44 interacting with a single supplier 40), one-to-many (a single seller 44 interacting with multiple suppliers 40 and vice versa) and many-to-many (multiple sellers 44 interacting with multiple suppliers 40) relationships. The basic concept of JIT fulfillment remains the same whether it is a single tier or multi-tier value chain or whether one-to-one or one-to-many relationships are modeled. Although the concepts described herein primarily relate to the relationships between a seller 44 and a supplier 40, these concepts are applicable between any two participants 30 in a value chain.

As described above, DIMS 20 provides an integration service that communicates with systems 32 to get the relevant inventory and related business data as and when required. All relevant data may be stored at a single location (for example, at a seller location 44) or may be distributed at multiple locations (but integrated) and is made available to agents to automate businesses processes, such as a JIT process. Using such agents, a company can interconnect all of its trading partners and keep everyone synchronized with each other's current plans while tracking actual activity in real-time across companies. This increases the velocity in the value chain and results in increased efficiency, increased planning accuracy, improved ordering and inventory control, reduced inventories (and thus costs) throughout the supply chain.

FIG. 4 illustrates an example JIT fulfillment workflow that may be implemented and automated using JIT fulfillment agents associated with DIMS 20. The method begins at step 200 where a JIT agent associated with or in communication with DIMS 20 initiates and triggers a request from DIMS 20 to a seller 44 (such as a manufacturer) for a planning schedule for long-term planning (such as an EDI 830 message) and for a product inventory report (such as an EDI 852 message) at a predefined time interval (for example, daily or weekly). At step 202, the seller's inventory management system communicates the requested planning schedule and product inventory report to DIMS 20. This information may be communicated to VMI 20 in response to the request or at an appropriate user-defined time interval. Integration module 60 allows the receipt of this information from the seller's inventory management system 32 and may convert the information (for example, in an EDI message or messages) to an appropriate format for processing. The JIT agent may direct this translation based on rules for data conversion for the particular JIT program.

At step 204, DIMS 20 persists the scheduling data and updates the seller's stock levels for all SKUs based on the product activity data. At the direction of the JIT agent, DIMS 20 communicates the seller's forecast update based on the schedule to the suppliers' inventory management system 32 at step 206 (the communication may be translated if appropriate for each supplier 40). Alternatively, an agent may exist at the supplier 40 and have rules for data and format conversion for that particular supplier 40. At step 208, the relevant suppliers 40 use this data to plan their forecast and, in turn, communicate their forecast to downstream suppliers 40 using the JIT agent and DIMS 20, as described above.

At step 210, the JIT agent monitors the seller's stock levels communicated to DIMS 20 and sends an alert to the supplier at step 212 based on a JIT reorder strategy implemented as rules associated with the agent. Such an alert may communicated to a system 32 or directly to a user via e-mail, page, fax, or using any other appropriate communication technique. In addition or alternatively, the agent can create a shipping or delivery schedule (such as an EDI 862 message) and communicate this schedule at step 214 to relevant suppliers 40 when the inventory level reaches a pre-set just-in-time reordering point. Such a schedule may be communicated to the seller 44 for confirmation and seller 44 may modify it and upload the modified schedule to DIMS 20 at step 216. Furthermore, at step 218 the agent may communicate relevant information to order management system 50a for the creation of a purchase order for the items that are needed to increase the stock level. At step 220, order management system 50a communicates one or more appropriate orders to DIMS 20, and agent directs the communication of these orders to appropriate suppliers 40 at step 222.

At step 224, the relevant suppliers 40 communicate an acknowledgement of the alert, shipping schedule, and/or purchase orders. If the supplier cannot meet the shipping schedule, an exception workflow may be triggered. At step 226, the suppliers 40 perform transportation planning for the orders and communicate an order status to DIMS 20. The JIT agent directs the communication of the order status to seller 44 at step 228 to update the seller's order management system. Similarly subsequent order statuses like advanced shipment notices from suppliers 40 may be updated for an order in DIMS 20 and relayed to the seller 44. At step 230, the JIT agent also requests and receives the order status from relevant service providers 42 during transportation to update both the seller 44 and supplier 40. The JIT agent tracks the order until the status of the order is considered closed by both the participants 30, and the example method ends. All of the actions of the JIT agent described above may be the result of rules associated with the agent that dictate the action the agent takes when a particular information is received from a participant 30 (such as through a system 32), from an engine 50, and/or from any other appropriate source.

Although a JIT fulfillment agent is described in the example method above, numerous other types of agents may be used in conjunction with DIMS 20 to implement rules to execute a particular business function. For example, agents can be programmed to execute other replenishment programs, such as VMI or SMI, in a manner similar to that described above. Furthermore, agents can be programmed to evaluate data received from participants 30 and/or engines 50 and to generate alerts based on rules that are used to identify issues with the data (for example, maximum and/or minimum levels of a particular data measure, violation of timing-based tolerances, or mismatched in ordered and delivered items). Agents may also generate alerts based on the absence or presence of a transaction (for example, the non-receipt of an expected EDI message). Agents may also be used to perform and/or initiate a business process, such as the creation and communication of a purchase order using an order management system based on an evaluation of inventory data from one or more participants 30. As described above, agents may also automate a series of tasks, such as automating the numerous tasks involved with a replenishment program (such as the JIT program described above). Agents may further be used to automate any other appropriate tasks associated with inventory management and thus may be used to efficiently leverage the inventory visibility provided by DIMS 20.

In addition to the advantages described above, the connectivity and visibility provided by DIMS 20 may also be used to perform distributed order fulfillment. Order fulfillment is the process of managing a customer order through its entire life cycle. Broadly classified, the life cycle of the order spans the processes of capture and creation, verification and approval, quoting, sourcing, planning and scheduling, execution, and returns management. The specifics within these order processes often vary to a high degree between industry segments and also between different sellers in the same industry segment. However, these different workflows have some basic similarities that can be traced to the business models followed by these sellers. These business models and their influence on existing order fulfillment processes are described below as context to the description of the novel distributed order fulfillment process made available using DIMS 20.

One aspect of order fulfillment is intra-enterprise fulfillment between the different portions of an enterprise. Intra-enterprise order fulfillment may be a challenge for sellers 44 having multiple divisions each having a separate order fulfillment process. These divisions typically may have disparate systems managing their order fulfillment life cycle and there has often been little visibility and coordination between these divisions. Similarly, a seller 44 may have multiple stocking locations for a product and ship from any of these locations depending on the buyer 48 and destination of an order. However, once a sourcing location has been identified and the order information has been sent to this location, the seller 44 may loose visibility to the order until it is actually delivered to the buyer 48. Having visibility to an order during order planning and execution steps and managing any exception thus becomes an expensive and time-consuming process for the seller 44.

For example, many large sellers 44 typically have multiple divisions that are managed and operated independently. These divisions may be organized by the product lines or by regions or by industry segments. Many of these divisions have different operating practices and business processes in place. They may also have disparate seller applications managing these business processes. As a result, it is difficult to get an aggregated view of data associated with the seller 44 across all these divisions. Because of the lack of an integrated environment, such sellers 44 often direct a buyer 48 to place an order with the division concerned and buyer 48 ends up sending multiple orders to different divisions of the same seller 44. This results in an increased ordering cost for the buyer 48 and increased order maintenance cost for seller 44. Some sellers 44 do use a single Internet store-front that allow a buyer 48 to place an order and then internally direct the order to the right division, but such a system still lacks the visibility at the back end of the supply chain where the actual order fulfillment takes place. This makes the order coordination across divisions a difficult task for a seller 44.

Furthermore, it is typical for a seller 44 to have multiple stocking locations from where a product can be shipped to a customer. The stocking locations may be distribution centers in different regions and/or warehouses near the seller's manufacturing plants. Depending on the number of these locations and the products stored each location, the sourcing decision for a customer order can become complex to manage effectively. Most of these sourcing decisions are static in nature, such as a distribution center in a region supplying to the customers in that region to minimize the transportation cost. These static rules often lead to situations where a customer order is delayed in one distribution center because of product shortage even though a distribution center in a different region may have excess of the product.

Problems also exist with order fulfillment in an multi-enterprise ordering environment. In such an environment, buyers 48 depend on a multitude of sellers 44 for various products (or sellers 44 depend on a multitude of suppliers 40). Because these sellers 44 are different entities, the buyers 48 work with these sellers 44 independently to manage the order fulfillment process. For example, a buyer 48 would typically have a contract in place with a number of sellers 44 of different products. During an order fulfillment process, the buyer 48 would place purchase orders separately to these sellers 44 for the specific products that they supply. The buyer 48 would then follow-up independently with each of these sellers 44 during the order life cycle. This leads to increased ordering cost and makes the order coordination between sellers 44 extremely difficult.

Most of the order fulfillment challenges for participants 30 in a value chain result from the lack of visibility into each other's supply chain and lack of information sharing between participants 30. Buyers 48 often do not get the right promise from their sellers 44 on their orders and thus do not get the product at the right time. This forces them to maintain a higher level of inventory for the critical products or components, which leads to higher carrying cost. Similarly a buyer 48 often cannot place a consolidated order to multiple sellers 44 and be able to track the order through its whole life cycle. This results in higher ordering cost and order management cost.

Many of sellers' fulfillment-related problems stem for an inaccurate demand information from a buyer 48. Even when the demand planning is within acceptable limits, the sellers 44 still incur major fulfillment-related problems because their material, product, and/or capacity profiles are unreliable. The most common causes of this include internal production or procurement problems, in addition to poor communications with the buyers 48 (often due the high connectivity costs). These problems contribute to excessive fulfillment cycle time, expediting costs, poor margins and service levels and, ultimately, lost business.

DIMS 20 may be used to provide a distributed order fulfillment service that provides participants 30 with the infrastructure and a configurable set of workflows to manage the entire life cycle of a distributed order (for example, a multi-seller or multi-divisional order). The distributed order fulfillment process implemented using DIMS 20 may be used to manage the entire life cycle of an order starting with order capture and promise and ending with a proof of delivery and subsequent financial settlement of the order. To provide these functions, appropriate order management and fulfillment modules may be added to or associated with DIMS 20 in particular cases or such functions may be implemented, in part, through appropriate engines 50 in communication with DIMS 20. This distributed order fulfillment process provides fast and accurate order promising, real-time order status reporting for a seller 44 and for its buyers 48, dynamic sourcing decision-making for optimal order fulfillment, and efficient exception management and error handling.

Figure 5A:
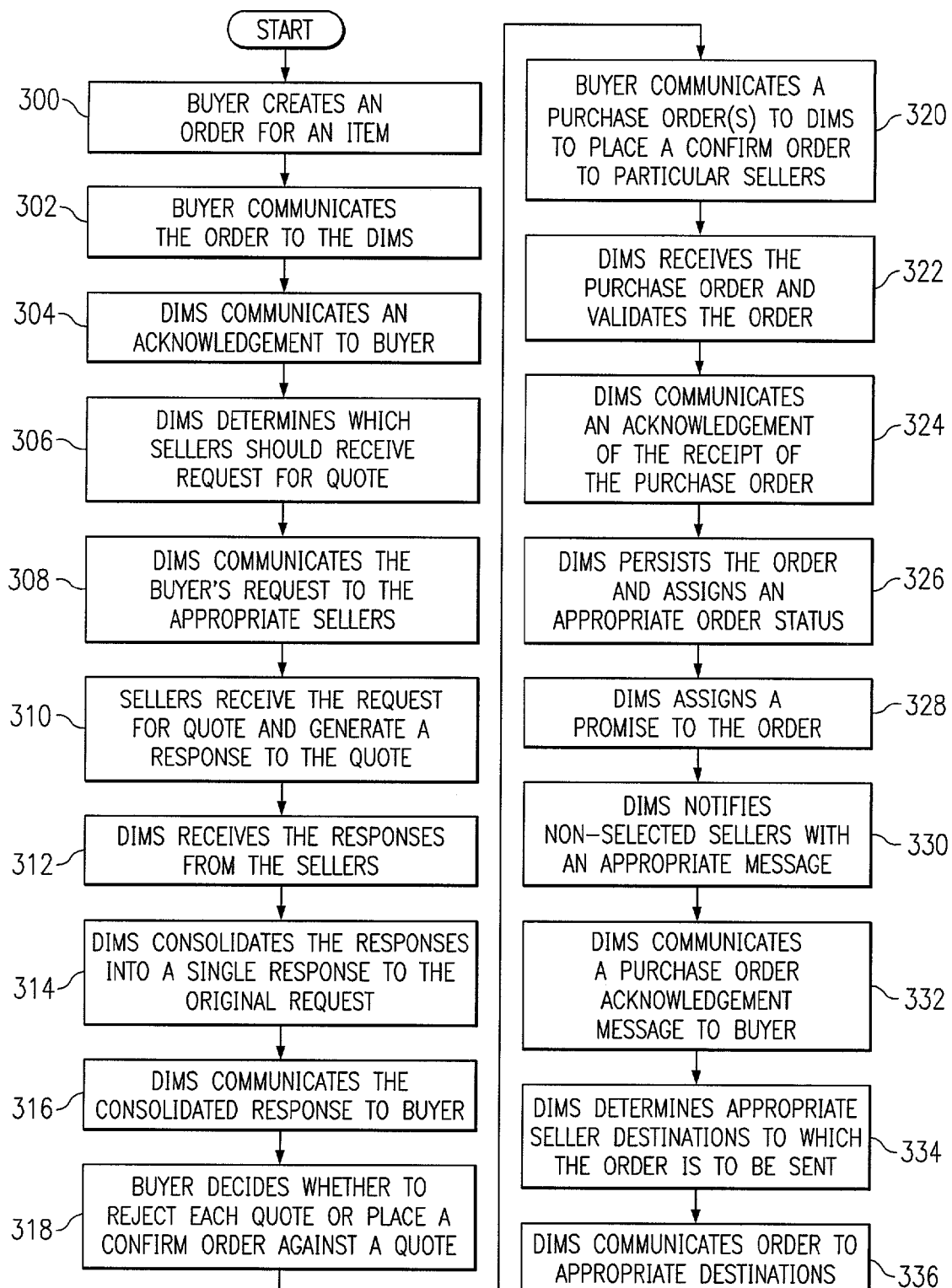
FIGS. 5A and 5B illustrate an example distributed order fulfillment method.
Figure 5B:
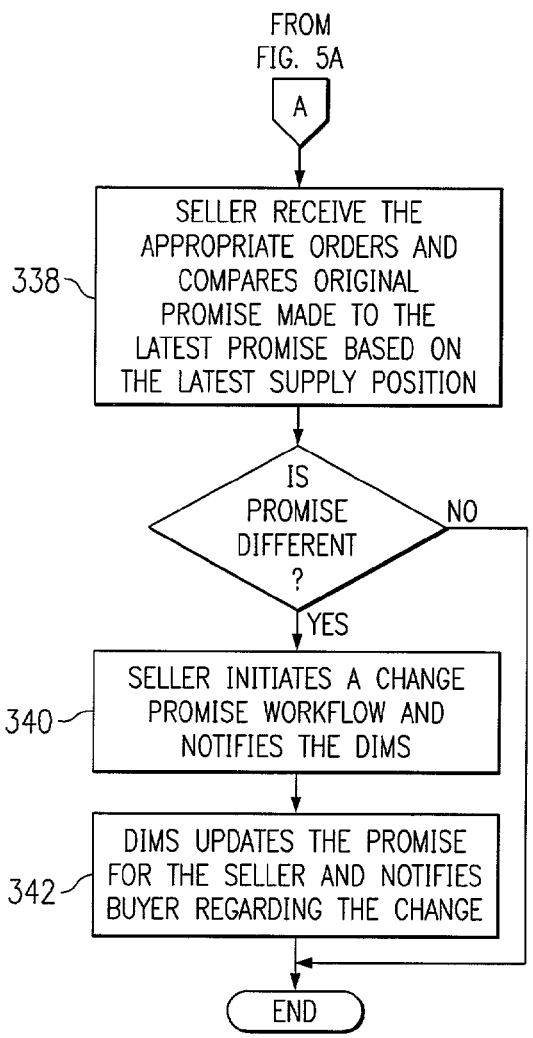

FIGS. 5A and 5B illustrate an example distributed order fulfillment method. As described above, order fulfillment workflows may vary greatly between the industry segments and also between different sellers 44. Therefore, an example generic distributed order fulfillment process is described below. This example process may be divided into two segments: order fulfillment and order execution. Order fulfillment includes the processes of capture and creation, verification and approval, quoting, sourcing, and scheduling of an order. Order execution includes the processes of warehouse planning and execution and transportation execution and management.

The method begins at step 300 where a buyer 48 creates an order for an item, such as a product. Although a buyer 48 is described as purchasing items from sellers 44, it should be understood that the process applies equally to sellers 44 purchasing items from suppliers 40, suppliers 40 purchasing items from other suppliers, and any other appropriate transactions between participants 30 in a value chain. Some of the parameters included in the created order may be the requested item(s), the corresponding due date and quantity of each item, and the desired sellers 44 for an item (for example, the buyer 48 may have existing contracts with particular sellers 44). Buyer 48 may alternatively specify a list of sellers 44 who are eligible to supply an item in the order.

Once the order is created, buyer 48 communicates the order to DIMS 20 at step 302 for either a quote (using a request for quote) or a promise (using a request for promise). For example, if buyer 48 is EDI-enabled, buyer 48 may send an EDI 840 message to DIMS 20 for a quote or an EDI 850 message to place a confirm order. For the purposes of this description, it is assumed that buyer 48 first communicates a request for quote. At step 304, DIMS 20 may send a functional acknowledgement (such as an EDI 997 message) to buyer 48 upon receipt of the request. At step 306, DIMS 20 determines, using the information about participants modeled in DIMS 20, which sellers 44 should receive the request based on the items requested in the order and, if applicable, the set of potential suppliers requested by buyer 48. Depending on the number of items included in an order and the sellers 44 requested by buyer 48, each seller 44 might receive one or more line items for a quote. This function, as well as the other functions of DIMS 20 described below, may be performed using one or more of the modules described above and/or using one or more additional modules (such as a fulfillment server) added specifically for distributed order fulfillment functions. Again, the various modules of DIMS 20 may be co-located at one location (for example, at a location associated with a participant 30 or a third party) or they may be located at multiple locations (and potentially replicated at multiple locations). For example, relevant sellers 40 may be identified using data from relationship modeling module 64. If the terms of the buyer's contracts with one or more sellers 44 are communicated to and stored by DIMS 20, DIMS 20 may access these contractual terms to determine appropriate sellers 48 for the buyer's requested items and the corresponding prices for each item, if specified in the terms.

At step 308, DIMS 20 communicates the buyer's request to the appropriate sellers 44 (if a seller 44 is EDI enabled, DIMS 20 may communicate an EDI 840 message to the seller 44). At step 310, the selected sellers 44 receive the request for quote and generate a response to the quote. The generation of the response is an intra-seller task and the mechanism for generating such a quote may range from a completely manual process to the use of a sophisticated order-quoting engine, such as a demand fulfillment engine.

At step 312, DIMS 20 may receive the responses from the sellers 44 (possibly over a window of time specified by buyer 48 during which responses will be accepted). DIMS 20 consolidates these responses into a single response to the original request at step 314. The business logic of consolidation of the individual responses is configurable by buyer 48. For example, one buyer may want to see all the responses from all the sellers 44 and then select the best response, whereas another buyer may prefer that DIMS 20 determine, based on pre-configured business rules, the best response to the request. These business rules may be implemented in an agent or using any appropriate modules of DIMS 20. At step 316, DIMS 20 communicates the consolidated response to buyer 48. If buyer 48 is EDI-enabled, an EDI 843 message may be sent to buyer 48.

Upon receiving the response, buyer decides at step 318 whether to reject the quote or place a confirm order against the quote. If buyer 48 decides to place a confirm order, buyer 48 communicates a purchase order to DIMS 20 at step 320 (if buyer 48 is EDI-enabled, buyer 48 may communicate an EDI 850 message for order confirmation). It is assumed that the purchase order creation is an intra-enterprise activity for buyer 48. The mechanism used by buyer 48 to create a purchase may include a manual process, an ERP system, an order management system, or any other appropriate mechanism. At step 322, DIMS 20 receives the purchase order and may validate the order according to business rules established between buyer 48 and a seller or sellers 44. At step 324, DIMS communicates an acknowledgement of the receipt of the purchase order (such as an EDI 997 message).

Once the order is received by DIMS 20, it is persisted in DIMS 20 or an associated engine 50 (such as an order management engine 50a) and is given an appropriate order status at step 326. At step 328, if the order is based on a previous quote, DIMS 20 assigns a promise to the order based on both earlier responses by the sellers 44 and/or the buyer's selection of a quote and the order status is adjusted appropriately to indicate the promised state. In addition or alternatively, DIMS 20 may provide a real-time promise to buyer 48 on behalf of a seller 44 based on inventory information provided to DIMS 20 by the seller 44. Therefore, DIMS 20 provides buyers 48 with a selective view to the sellers' inventory to help plan their own orders. If a seller 44 is not used for final confirmed purchase order, DIMS 20 may notify the seller 44 with an appropriate message at step 330. At step 332, DIMS 20 communicates a message to the buyer (such as an EDI 855 message) for purchase order acknowledgement.

At step 334, DIMS 20 determines appropriate destinations to which the order is to be sent and communicates the order to the appropriate destinations associated with sellers 44 at step 336. Each seller 44 receives a purchase order that only consists of the line items concerning that seller 44. If the supplier is EDI-enabled, DIMS 30 may communicate an EDI 850 message to seller 44. As described above, a seller 44 may have multiple independent divisions or multiple warehouses supplying a specific item. In addition, the seller 44 may have multiple suppliers 40 that can either supply the item to the seller 44 or drop-ship the item to the buyer 48 for the seller 44 if needed. In scenarios like this, the seller 44 has previously needed to search through all of the divisions and/or warehouses to find out the item availability and the sourcing location. The sourcing logic can become extremely complex and can become unmanageable for a large seller 44. In addition, once an item it is sourced to a division or warehouse, the seller 44 may loose visibility to the order at the seller level because of the lack of visibility to the divisional operation. However, DIMS 20 provides sellers 44 with a scalable and configurable framework to implement these complex sourcing rules and automate the sourcing process.

For example, assume that a buyer 48 requests that an item be shipped to its New Jersey distribution center from a seller 44 that stocks the item in distribution centers based in Los Angeles and Chicago. If minimizing the transportation costs is one of the sourcing criteria, then the business rules can be configured in DIMS 20 to source the item from Chicago instead of Los Angeles (assuming it will cost less to ship from Chicago). As another example, DIMS 20 may source the order from a the warehouse of a seller 44 having the most unpromised inventory of the ordered item (according to the inventory data provided to DIMS 20). DIMS 20 provides sellers 44 a scalable framework to conveniently model the various sourcing rules that may be used. Once the sourcing logic is configured in DIMS 20 for a seller 44, then the purchase order from buyer 48 can be communicated directly to the particular division or warehouse selected at step 336.

At step 338, each seller 44 (as described above, the term seller as used here may refer to a particular division of a seller 44 or other destination associated with a seller 44, and each destination may be modeled in DIMS 20 as a participant 30) receives the appropriate order and may compare the original promise made in the response to the request for quote (made by a seller 44 and/or made by DIMS 20 on behalf of seller 44) to the latest promise based on the latest supply position. If the promise is different, then the seller 44 may initiate a change promise workflow at step 342 and notify the buyer 48 via DIMS 20 (in cases when the purchase order is not a result of a quote process, seller 44 sends the promise information to DIMS 20). If the seller 44 is EDI-enabled, it may send an EDI 855 message (purchase order acknowledgement) to DIMS 20 to update the earlier promise or send a new promise. At step 344, DIMS 20 updates the promise for the seller 44, if needed, and notifies buyer 48 regarding any change (for example, by communicating an EDI 855 message to buyer 48). This completes the order fulfillment process for the order. It should be noted that while a seller 44 is responsible for only one or more line items of the buyer's purchase order, DIMS 20 keeps track of the buyer's complete purchase order and provides buyer 48 with real-time order status updates, as described below.

Figure 6A:
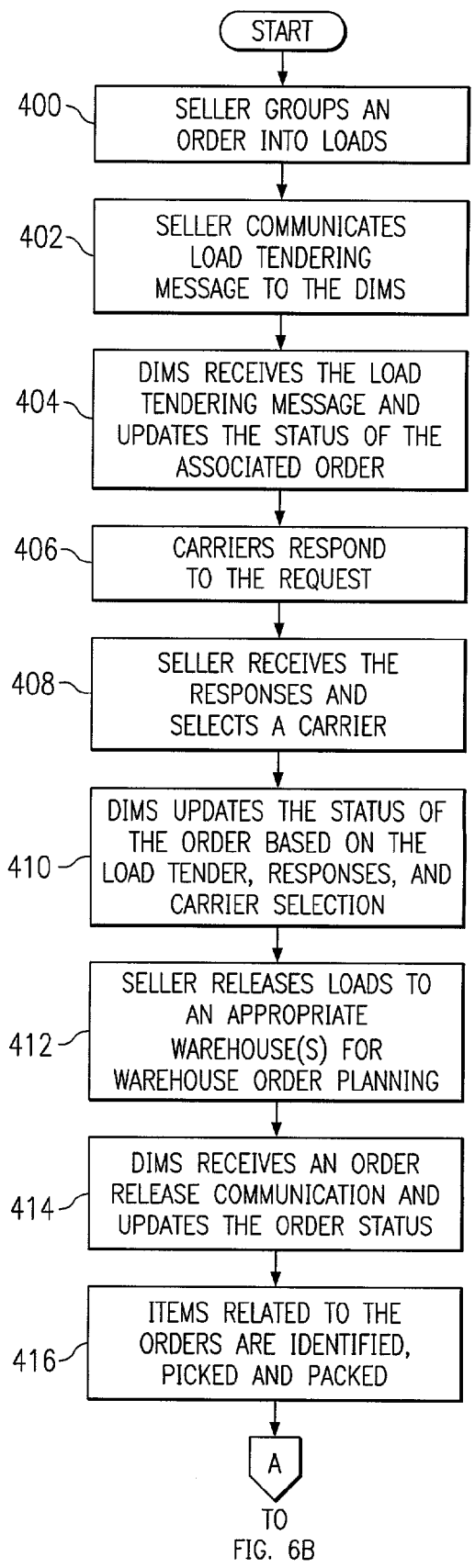
FIGS. 6A and 6B illustrates an example distributed order execution method.
Figure 6B:
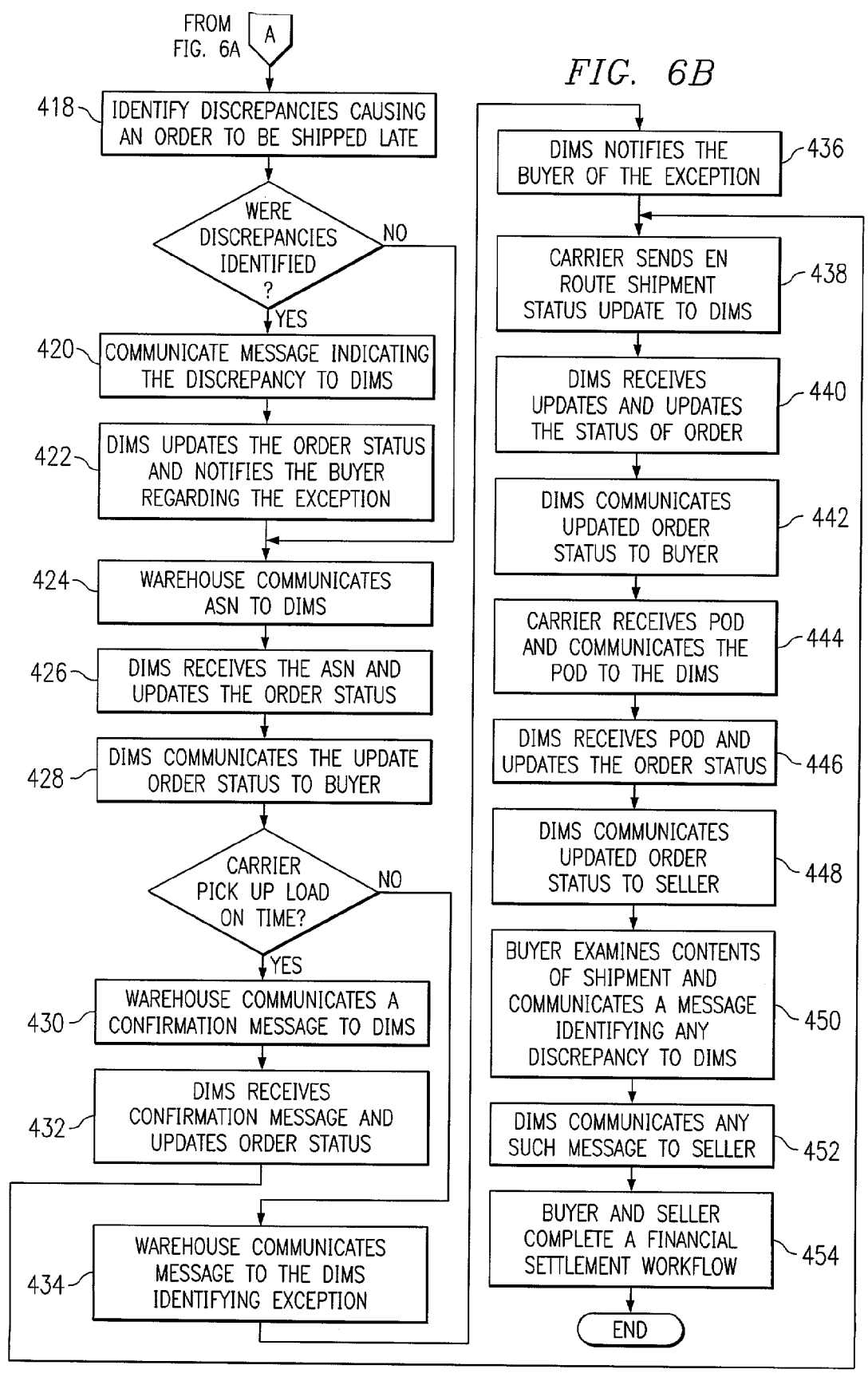

FIGS. 6A and 6B illustrate an example distributed order execution method. Order execution includes the processes of warehouse planning and execution and transportation execution and management. The order execution process typically involves tasks performed by the seller 44 and associated third party service providers 46 to deliver the order to the buyer destination (although, as described above, the process applies equally to sellers 44 purchasing items from suppliers 40 and using service providers 42, suppliers 40 purchasing items from other suppliers 40 and using service providers if appropriate, and any other suitable transactions between participants 30 in a value chain). Although these tasks are mainly intra-enterprise to the seller 44, the status of the order is keep updated and received by buyer 48 and other appropriate participants 30 using DIMS 20. Furthermore, the various communications between the participants 30 described below may be communicated directly between the participants 30 and/or via DIMS 20.

An order is often shipped by a seller 44 in shipments or loads. Grouping of orders into a load or shipment allows the seller 44 to minimize its transportation cost. Transportation planning is the process where the seller 44 groups the orders into optimized shipments or loads based on a set of criteria such as destination, source, routes, transportation cost, special handling instruction, and any other appropriate criteria. The transportation planning process may also take into account any merge-in-transit and/or value added service constraints on the order.

The example method begins at step 400 where the seller 44 carries out appropriate transportation planning for an order by grouping the order into loads or shipments. The outcome of such a planning process is a set of loads that consist of one or more orders with one or more items. Once the loads are created, the loads are tendered to one or more carriers 46 for transportation at step 402. Load tendering is the process where carriers 46 are contacted with the load information (for example, source, destination, item, and pick-up/delivery window). The messages associated with transportation planning, as well as all other messages associated with order execution, may be communicated to the appropriate entity using DIMS 20 (and the message may be communicated directly to the entity, if appropriate). At step 404, DIMS 20 receives the load tendering message and updates the status of the associated order (for example, the order status may change to "load tendered" status).

At step 406, DIMS 20 communicates the load tendering message to appropriate carriers 46 and carriers 46 respond to the request. Seller 44 receives the responses (for example, using DIMS 20) and selects a carrier 46 at step 408. Seller 44 may have a predefined contract with a specific carrier 46 for a set of routes or a region. If seller 44 and a carrier 46 are connected via EDI, the seller 44 may communicate an EDI 204 to the carrier 46 and carrier 46 may send an acceptance using an EDI 990 message (these messages may be sent directly or via DIMS 20). At step 410, DIMS 20 receives these messages and updates the status of the order based on the messages (for example, the order status may change "tender accepted" status).

Once a tender has been accepted by a carrier 46, the loads are released at step 412 to an appropriate warehouse for warehouse order planning. The warehouse is also notified about the appointment time when the carrier's trailer should arrive at the warehouse to pick up the load. Seller 44 may send an EDI 940 message to a warehouse as the order release signal. DIMS 20 receives the order release communication at step 414 and updates the order status appropriately. Once a warehouse receives a release notice, the items related to the orders are identified, picked and packed at step 416. This operation is usually a batch process and is done a few times during a typical day depending on the order volume. Any discrepancy that would cause an order to be shipped late is identified at step 418 and a message indicating any discrepancy is communicated to DIMS 20 at step 420. At step 422, DIMS 20 updates the order status appropriately and notifies the buyer about the exception. The buyer may then initiate a change order workflow, if desired.

Once the shipments are created, they are moved to the specified area or dock where the carrier is to load the order. At step 424, the warehouse communicates an advanced ship notice (ASN) to DIMS 20 (for example, an EDI 856 message may be sent as an ASN). A typical ASN includes the order number, the items being shipped, the delivery date, the delivery window, and any other appropriate parameters. At step 426, DIMS 20 receives the ASN and updates the order status. DIMS 20 communicates the update order status to buyer 48 at step 428.

If a carrier 46 picks up a loads from the warehouse dock at the specified time, a confirmation message (such as an EDI 214 message) is communicated to DIMS 20 at step 430. DIMS 20 receives this message and updates the order status appropriately at step 432. If the carrier does not show up at the appointed time, the orders need to be re-planned for a future date and time. In such a case, an appropriate message is communicated at step 434 from the warehouse to DIMS 20 to identify this exception. DIMS 20 notifies the buyer of this exception through an exception management workflow at step 436.

Once carrier 46 has picked up a load, carrier 46 may send a daily or other periodic en route shipment status updates to DIMS 20 at step 438. At step 440, DIMS 20 receives such updates and updates the status of the order. At step 442, DIMS 20 may communicate the updated order status to buyer 48 as updated, on a request basis, or at any other appropriate times (in some cases, DIMS 20 may only communicate an update if an exception has occurred). Once the shipment is delivered to the buyer destination, the carrier receives a proof of delivery (POD) and communicates the POD (for example, and EDI 214 message) to DIMS 20 at step 444 to indicate the completion of the delivery process. An EDI 214 message may be sent for a POD confirmation. DIMS 20 receives the POD and updates the order status to indicate a POD status at step 446. At step 448, the updated order status is communicated to seller 44 (and may be directed to the specific warehouse which shipped the order, if appropriate).

The buyer at this stage can examine the contents of the shipment and communicate a message at step 450 identifying any discrepancy between the ASN and the actual delivery. DIMS 20 communicates any such message to seller 44 at step 452. Furthermore, DIMS 20 may provides an exception management workflow to handle these exceptions. At step 454, buyer 48 and seller 44 complete a financial settlement workflow in which the supplier communicates an invoice (for example, an EDI 810 message) to buyer 48 and buyer 48 makes a payment to seller 44 (for example, using an EDI 820 message), and the example method ends. In particular embodiments, these financial settlement communication messages may be communicated between buyer 48 and seller 44 using DIMS 20.

Although the present invention has been described with several embodiments, numerous changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A distributed inventory management system, the system comprising one or more components collectively operable to:
receive information regarding a plurality of distributed participants in one or more tiers of a value chain, wherein each tier of the one or more tiers of the value chain comprise a different replenishment process associated with one or more of the plurality of distributed participants, and information regarding one or more items in the one or more tiers of the value chain;
model relationships between at least two of the plurality of distributed participants in the different tiers of the one or more tiers of the value chain based on the received information;
model the one or more items based on the received information;
receive inventory data from one or more of the plurality of distributed participants relating to the one or more items;
process the inventory data based on the models of the relationships and the items to generate inventory information related to one or more of the distributed participants; and
communicate the generated inventory information to one or more of the plurality of distributed participants in a different tier of the value chain, the inventory information including at least inventory data of participants other than those participants to which the inventory information is communicated.

2. The system of claim 1, wherein the components are further operable to:
receive the inventory data from a plurality of different data management systems associated with the participants; and
translate the received inventory data for processing if such inventory data has a format which the components of the distributed inventory management system are unable to process.

3. The system of claim 2, wherein one or more of the data management systems comprise an enterprise resource planning system, a warehouse management system, or a decision support system.

4. The system of claim 1, wherein modeling the relationships between two or more of the participants comprises specifying the identity of one or more of the participants, the locations of the participants, the roles of the participants in the one or more tiers of the value chain, and one or more business rules associated with one or more of the participants.

5. The system of claim 1, wherein modeling the items comprises specifying the identity of one or more items relevant in the one or more tiers of the value chain, a description of the items, the locations at which each item is active, and an item hierarchy.

6. The system of claim 1, wherein the generated inventory information comprises the output of one or more business workflows that use an aggregation of the inventory data received from two or more of the participants.

7. The system of claim 1, wherein the generated inventory information comprises a view of particular inventory data of a one or more first participants that is relevant to a second participant.

8. The system of claim 1, wherein the generated inventory information comprises one or more alerts generated in response to the analysis of particular received inventory data according to one or more business rules.

9. The system of claim 1, wherein the generated inventory information comprises one or more alerts generated in response to monitoring one or more key performance indicators.

10. The system of claim 1, wherein the components are operable to communicate the generated inventory information to applicable participants upon generation of the inventory information.

11. The system of claim 1, wherein the components are operable to communicate the generated inventory information to an applicable participant upon receiving a request from the participant.

12. The system of claim 1, wherein the components are further operable to:
communicate inventory data associated with a plurality of the participants to one or more planning or scheduling engines;
receive inventory planning or scheduling information from the engines; and
communicate at least a portion of the planning information to one or more of the participants.

13. The system of claim 12, wherein one or more of the engines comprise a replenishment planning engine, an order management system, a demand fulfillment engine, a supply chain planner, or a factory planner.

14. The system of claim 12, wherein one or more of the engines are associated with one or more of the participants.

15. The system of claim 1, wherein one or more of the components of the system are operated by one or more of the participants.

16. The system of claim 1, wherein one or more of the components of the system are implemented in an e-marketplace independent of the participants.

17. A method for distributed inventory management, comprising:
receiving information regarding a plurality of distributed participants in one or more tiers of a value chain, wherein each tier of the one or more tiers of the value chain comprise a different replenishment process associated with one or more of the plurality of distributed participants, and information regarding one or more items in the one or more tiers of the value chain;
modeling relationships between at least two of the plurality of distributed participants in different tiers of the one or more tiers of the value chain based on the received information;
modeling the one or more items based on the received information;
receiving inventory data from one or more of the plurality of distributed participants relating to the one or more items;
processing the inventory data based on the models of the relationships and the items to generate inventory information related to one or more of the distributed participants; and
communicating the generated inventory information to one or more of the plurality of distributed participants in a different tier of the value chain, the inventory information including at least inventory data of participants other than those participants to which the inventory information is communicated.

18. The method of claim 17, further comprising:
receiving the inventory data from a plurality of different data management systems associated with the participants; and
translating the received inventory data for processing if such inventory data has a format which the components of the distributed inventory management system are unable to process.

19. The method of claim 18, wherein one or more of the data management systems comprise an enterprise resource planning system, a warehouse management system, or a decision support system.

20. The method of claim 17, wherein modeling the relationships between two or more of the participants comprises specifying the identity of one or more of the participants, the locations of the participants, the roles of the participants in the one or more tiers of the value chain, and one or more business rules associated with one or more of the participants.

21. The method of claim 17, wherein modeling the items comprises specifying the identity of one or more items relevant in the one or more tiers of the value chain, a description of the items, the locations at which each item is active, and an item hierarchy.

22. The method of claim 17, wherein the generated inventory information comprises the output of one or more business workflows that use an aggregation of 10 the inventory data received from two or more of the participants.

23. The method of claim 17, wherein the generated inventory information comprises a view of particular inventory data of a one or more first participants that is relevant to a second participant.

24. The method of claim 17, wherein the generated inventory information comprises one or more alerts generated in response to the analysis of particular received inventory data according to one or more business rules.

25. The method of claim 17, wherein the generated inventory information comprises one or more alerts generated in response to monitoring one or more key performance indicators.

26. The method of claim 17, the generated inventory information is communicated to applicable participants upon generation of the inventory information.

27. The method of claim 17, the generated inventory information is communicated to an applicable participant upon receiving a request from the participant.

28. The method of claim 17, further comprising:
communicating inventory data associated with a plurality of the participants to one or more planning or scheduling engines;
receiving inventory planning or scheduling information from the engines; and
communicating at least a portion of the inventory planning or scheduling information to one or more of the participants.

29. The method of claim 28, wherein one or more of the engines comprise a replenishment planning engine, an order management system, a demand fulfillment engine, a supply chain planner, or a factory planner.

30. The method of claim 28, wherein one or more of the engines are associated with one or more of the participants.

* * * * *

UNITED STATES PATENT AND TRADEMARK OFFICE
CERTIFICATE OF CORRECTION

PATENT NO. : 7,574,383 B1  Page 1 of 1
APPLICATION NO. : 10/120571
DATED : August 11, 2009
INVENTOR(S) : Parasnis et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1024 days.

Signed and Sealed this

Fourteenth Day of December, 2010

David J. Kappos
*Director of the United States Patent and Trademark Office*